US008756121B2

(12) United States Patent      (10) Patent No.: US 8,756,121 B2
Gonsalves et al.      (45) Date of Patent: Jun. 17, 2014

(54) RETAIL WEBSITE USER INTERFACE

(75) Inventors: Michael F. Gonsalves, Minneapolis, MN (US); Gregory M. Nations, Minneapolis, MN (US); Chad R. Gourley, Elk River, MN (US); Sarah E. Schoeffler, Minneapolis, MN (US); Patricia Korth-McDonnell, Brooklyn, NY (US); Joe Stewart, Brooklyn, NY (US)

(73) Assignee: Target Brands, Inc., Minneapolis, MN (US)

( * ) Notice: Subject to any disclaimer, the term of this patent is extended or adjusted under 35 U.S.C. 154(b) by 378 days.

(21) Appl. No.: 13/176,671

(22) Filed: Jul. 5, 2011

(65) Prior Publication Data

US 2012/0191577 A1    Jul. 26, 2012

Related U.S. Application Data

(60) Provisional application No. 61/435,139, filed on Jan. 21, 2011.

(51) Int. Cl.
| | |
|---|---|
| *G06Q 30/00* | (2012.01) |
| *G06Q 30/06* | (2012.01) |
| *G06Q 30/02* | (2012.01) |
| *G06Q 30/08* | (2012.01) |
| G06Q 10/08 | (2012.01) |
| G06Q 20/12 | (2012.01) |
| G07F 7/00 | (2006.01) |

(52) U.S. Cl.
CPC ............ *G06Q 30/0643* (2013.01); *G06Q 30/06* (2013.01); *G06Q 30/02* (2013.01); *G06Q 30/00* (2013.01); *G06Q 30/08* (2013.01); G06Q 10/087 (2013.01); G06Q 20/12 (2013.01); G07F 7/00 (2013.01)
USPC ......... 705/27.2; 705/26.1; 705/26.7; 705/26.8

(58) Field of Classification Search
CPC ....... G06Q 30/00; G06Q 30/02; G06Q 30/06; G06Q 30/0603; G06Q 30/08; G06Q 10/087; G06Q 20/12; G07F 7/00

USPC ............................ 705/26.1, 26.7, 26.8, 27.2
See application file for complete search history.

(56) References Cited

U.S. PATENT DOCUMENTS

| | | | |
|---|---|---|---|
| D109,791 S | 5/1938 | Sonin | |
| 5,423,139 A | 6/1995 | Feldman | |

(Continued)

FOREIGN PATENT DOCUMENTS

| | | |
|---|---|---|
| CA | 2714783 | 6/2011 |
| EP | 2015245 | 1/2009 |

(Continued)

OTHER PUBLICATIONS

Sony Notebook Home Page, Retrieved Aug. 10, 2011 from the Internet at: http:store.sony.com/webapp/wcs/stores/servlet/CategoryDisplay?catalogId=10551&storeId=10151&langId=1&categoryId=16154&SR=nav:electronics:computers:laptops:shop__ compare:ss&ref=http%3A%2F%2Fwww.sony.com%2Findex.php, 5 pages.

(Continued)

*Primary Examiner* — Yogesh C Garg
(74) *Attorney, Agent, or Firm* — Merek, Blackmon & Voorhees, LLC

(57) ABSTRACT

In one embodiment, a web page presented to a user includes a header section that substantially spans the top of the web page and provides a menu of selectable options as well as a search input box. A product display region may be presented below the header and display images and information about a selected product. A product carousel may be presented below the product display region and show information about other products in a horizontally scrollable list. Two columns of various types of product review information provided by sources such as professional reviewers, existing owners, and the user's friends may be displayed below the product carousel. A sortable and filterable grid of products may be displayed below the review information such that the user's attention is drawn to the variety of products available for purchase.

23 Claims, 9 Drawing Sheets

(56) References Cited

U.S. PATENT DOCUMENTS

| | | | |
|---|---|---|---|
| 5,644,735 A | 7/1997 | Luciw et al. |
| 5,956,709 A | 9/1999 | Xue |
| D415,483 S | 10/1999 | Decker |
| 6,014,634 A | 1/2000 | Scroggie et al. |
| 6,026,376 A | 2/2000 | Kenney |
| 6,032,130 A | 2/2000 | Alloul et al. |
| 6,034,688 A | 3/2000 | Greenwood et al. |
| 6,055,573 A | 4/2000 | Gardenswartz et al. |
| 6,141,666 A | 10/2000 | Tobin |
| 6,182,871 B1 | 2/2001 | Lam |
| 6,216,139 B1 | 4/2001 | Listou |
| 6,298,330 B1 | 10/2001 | Gardenswartz et al. |
| 6,542,927 B2 | 4/2003 | Rhoads |
| 6,604,681 B1 | 8/2003 | Burke et al. |
| 6,766,212 B1 | 7/2004 | Dean |
| 6,965,376 B2 | 11/2005 | Tani et al. |
| 7,002,573 B2 | 2/2006 | Trotta et al. |
| 7,010,876 B1 | 3/2006 | Siegel et al. |
| 7,055,130 B2 | 5/2006 | Charisius et al. |
| 7,062,453 B1 | 6/2006 | Clarke |
| 7,263,499 B2 | 8/2007 | Kunigita |
| 7,284,206 B2 | 10/2007 | Ozawa et al. |
| 7,409,362 B2 | 8/2008 | Calabria |
| 7,503,502 B2 | 3/2009 | Montague |
| D590,412 S | 4/2009 | Saft et al. |
| 7,529,797 B2 | 5/2009 | Tseng et al. |
| D599,373 S | 9/2009 | Kobayashi et al. |
| 7,603,292 B1 | 10/2009 | Bragg et al. |
| 7,613,687 B2 | 11/2009 | Nye |
| 7,676,387 B2 | 3/2010 | Childress et al. |
| 7,680,703 B1 * | 3/2010 | Smith .................. 705/26.8 |
| 7,702,542 B2 | 4/2010 | Aslanian |
| 7,720,723 B2 * | 5/2010 | Dicker et al. ............. 705/26.8 |
| D619,613 S | 7/2010 | Dunn |
| D622,280 S | 8/2010 | Tarara |
| D625,323 S | 10/2010 | Matsushima et al. |
| D626,133 S | 10/2010 | Murphy et al. |
| 7,890,378 B2 | 2/2011 | Clarke et al. |
| 7,996,282 B1 | 8/2011 | Scott et al. |
| 8,001,003 B1 | 8/2011 | Robinson et al. |
| D644,663 S | 9/2011 | Gardner et al. |
| D656,950 S | 4/2012 | Shallcross et al. |
| 8,244,590 B2 | 8/2012 | Rothman |
| 8,250,145 B2 | 8/2012 | Zuckerberg et al. |
| 8,606,652 B2 * | 12/2013 | Gonsalves et al. .......... 705/26.7 |
| 2001/0029465 A1 | 10/2001 | Strisower |
| 2002/0046105 A1 | 4/2002 | Gardenswartz et al. |
| 2002/0165799 A1 | 11/2002 | Jaffe et al. |
| 2003/0014501 A1 | 1/2003 | Golding et al. |
| 2003/0050848 A1 | 3/2003 | Defayette et al. |
| 2005/0055321 A1 | 3/2005 | Fratkina et al. |
| 2005/0081251 A1 | 4/2005 | Walker et al. |
| 2005/0144093 A1 | 6/2005 | Kassan |
| 2005/0147054 A1 | 7/2005 | Loo et al. |
| 2005/0149269 A1 | 7/2005 | Thomas et al. |
| 2006/0053066 A1 | 3/2006 | Sherr et al. |
| 2006/0103130 A1 | 5/2006 | Koivukunnas et al. |
| 2006/0277103 A1 | 12/2006 | Fujita et al. |
| 2006/0277477 A1 | 12/2006 | Christenson |
| 2007/0022020 A1 | 1/2007 | Bernstein |
| 2007/0078850 A1 | 4/2007 | Aziz et al. |
| 2007/0095615 A1 | 5/2007 | Spector |
| 2007/0162850 A1 | 7/2007 | Adler et al. |
| 2007/0192168 A1 | 8/2007 | Van Luchene |
| 2007/0226189 A1 | 9/2007 | Piekos et al. |
| 2007/0244883 A1 | 10/2007 | Bessieres et al. |
| 2007/0244900 A1 | 10/2007 | Hopkins et al. |
| 2007/0300261 A1 | 12/2007 | Barton et al. |
| 2008/0005125 A1 | 1/2008 | Gaedeke |
| 2008/0077487 A1 | 3/2008 | Davis et al. |
| 2008/0097844 A1 | 4/2008 | Hsu et al. |
| 2008/0147640 A1 | 6/2008 | Schachter |
| 2008/0235085 A1 | 9/2008 | Kovinsky et al. |
| 2008/0255962 A1 | 10/2008 | Chang et al. |
| 2008/0270248 A1 | 10/2008 | Brill |
| 2008/0270250 A1 | 10/2008 | Bolivar et al. |
| 2009/0037355 A1 | 2/2009 | Brave et al. |
| 2009/0106085 A1 | 4/2009 | Raimbeault |
| 2009/0106113 A1 | 4/2009 | Arora et al. |
| 2009/0132388 A1 | 5/2009 | Omori et al. |
| 2009/0164315 A1 | 6/2009 | Rothman |
| 2009/0164323 A1 | 6/2009 | Byrne |
| 2009/0171812 A1 | 7/2009 | Fadell |
| 2009/0173792 A1 | 7/2009 | Montague |
| 2009/0199115 A1 | 8/2009 | Singh |
| 2009/0265968 A1 | 10/2009 | McNamee |
| 2009/0273612 A1 | 11/2009 | Xie |
| 2009/0292599 A1 | 11/2009 | Rampell et al. |
| 2009/0299965 A1 | 12/2009 | Aziz et al. |
| 2009/0307100 A1 | 12/2009 | Nguyen et al. |
| 2010/0114720 A1 | 5/2010 | Jones et al. |
| 2010/0179876 A1 | 7/2010 | Holte |
| 2010/0186066 A1 | 7/2010 | Pollard |
| 2010/0223082 A1 | 9/2010 | Becker et al. |
| 2011/0029368 A1 | 2/2011 | Hsu et al. |
| 2011/0125569 A1 | 5/2011 | Yoshimura et al. |
| 2011/0153451 A1 | 6/2011 | Bitz et al. |
| 2011/0173095 A1 | 7/2011 | Kassaei et al. |
| 2011/0225152 A1 | 9/2011 | Beaudreau et al. |
| 2011/0302498 A1 | 12/2011 | Gorodyansky |
| 2012/0166945 A1 | 6/2012 | Roberts et al. |

FOREIGN PATENT DOCUMENTS

| | | |
|---|---|---|
| WO | WO 00/79446 | 12/2000 |
| WO | WO 01/84447 | 1/2001 |
| WO | WO 01/45020 | 6/2001 |
| WO | WO 02/03268 | 1/2002 |
| WO | WO 2005/066844 | 7/2005 |
| WO | WO 2006/101348 | 9/2006 |
| WO | WO 2007/005431 | 1/2007 |

OTHER PUBLICATIONS

Logitech Mouse Home Page, Retrieved Aug. 10, 2011 from the Internet at: http://www.logitech.com/en-us/mice-pointers/mice, 13 pages.

Etihad Airways Home Page, Retrieved Aug. 10, 3011 from the Internet at: http://www.etihadairways.com/sites/etihad/us/en/home/pages/home.aspx?cid=ppc_start, 1 page.

Poem entitled "i carry your heart with me (i carry it in," by E.E. Cummings [On-line], Poem dated 1920. Retrieved from Internet 06-3-2-13. URL:>http://en.wikipedia.org/wiki/E._E._Cummings<. . (12 pages, see p. 5).

Office Action from Canadian Patent Application No. 145,725 mailed Oct. 1, 2012 (1 page).

Steve Eastman Presentation, Target Managers Meeting, Mar. 15, 2010

TGT—Target Financial Community Meeting, Jan. 21, 2010.

Office Action from Canadian Patent Application No. 2,763,808, mailed on May 16, 2013 (4 pages).

Amazon, Prime Eligible Under $25, [Online], Dec. 19, 2009, Retrieved from the Internet at: http :l/www.amazon.com/s/Znode=2238906011 &field%2dprice=%2d2500&p%5f76=1, 4 pages.

Amazon, Recommended for You, [Online], Dec. 21, 2009, Retrieved from the Internet at https:l/www.amazon.com/gp/yourstore?ie=UTF8&ref_=pd%5Firi%5Fgw, 3 pages.

Amazon.com Universal Wish List, [Online]. Dec. 20, 2010, Retrieved from the Internet at: http://www.amazon.com/b/?ie=UTF8&node=2223317011 &tag=googhydr-20&hvadid=3877744091&ref=pd_sl_37ck7ovrfc_b, 3 pages.

Bedding & Bath http:/fvvww.kohls.com/kohlsStore/bedandbath/towels/decorativetowels.jsp?bmForm=guided_nav-search&SubcatFolderID=2534374752660882, at least as early as Mar. 29, 2011 (2 pages).

Best Buy, Every Day Laptops, [Online], Dec. 13, 2009, Retrieved from the Internet at: http://www.bestbuy.com/site/Laptop-Computers/Everyday-Laptops, 4 pages.

(56) References Cited

OTHER PUBLICATIONS

BestBuy, Search Results for IT, Retrieved Aug. 5, 2011 from the Internet at: http:f/www.bestbuy.com/site/olspage.jsp;jsessionid=9B6687FFBB3C82, 8 pages.

Canon Digital Rebel XT Review (www.dcviews.com, Jul. 4, 2007, 5 pages.

Office Action from Canadian Patent Application No. 2.761,936, mailed Jul. 16, 2012 (3 pages).

Office Action from Canadian Patent Application No. 2.761,936, mailed Nov. 21, 2012 (3 pages).

Office Action from Canadian Patent Application No. 2.761,936, mailed Apr. 2013 (3 pages).

Office Action from Canadian Patent Application No. 2.761,560, mailed Apr. 18, 2013 (3 pages).

Office Action from Canadian Patent Application No. 2,781,784, mailed Nov. 27, 2012 (4 pages).

Facebook Adds Profile Preview Feature [Online], Jan. 7, 2010, Retrieved from the Internet at: http://www.allfacebook.com/facebook-adds-profile-preview-feature-2008-09, 5 pages.

Facebook Developers Facebook Connect, Build and grow with Facebook Connect; [Online] Dec. 18 2009, Retrieved from the Internet at: http://developers.facebook.com/connecl.php, 2 pages.

Gardella, Greg H., Letter to Robert T. Maldonado, Re: HUGE Inventors for Target Brands, Inc. Patent Applications, Apr. 11, 2011, 5 pages.

Google Product search results for "Canon Powershot", Retrieved Mar. 5, 2010 from the Internet at http://www.google.com/products?q=canon+powershot&aq=O&oq=canon+p, 3 pages.

Grannell, Craig, .net/techniques, /CCS/create a navigation bar Sep. 2, 2007, 4 pages.

HP Support, Search Results for "HP Pavilion dv7t-1 000" I FAQ, Retrieved Mar. 25, 2010 from the Internet at: http://h10061.www1.hp.com/ccsearch/search?pname=H P+Pavilion+dv7t-1000+CTO+Ent, 1 page.

Han, Taedong, Exploring Price and Product Information Search Behavior in e-Market, Proceedings of the International Conference on Information Technology: Coding and Computer, Mar. 2005, 6 pages.

Huge, Target Patents, Target Patent Annotations, PowerPoint Slides, Mar. 28, 2011, 35 pages.

Just-Style: connecting to consumers, [Online], Sep. 16, 2002, Retrieved from the Internet at: http://www.just-style.com/articleprinl.aspx?id=93012 on Dec. 19, 2009,4 pages.

Kitchen & Dining http:fvww.amazon.com/kitchen-dining-small-appliance-cookware/b?ie=UTF8&nodes=284507, at least D/S.L./ least as early as Jan. 28, 2011 (3 pages).

Kohls [Online], Dec. 20, 2010, Retrieved from the Internet at: http://www.kohls.com/upgrade/webstore/home.jsp;jessionid=3cSgNPp TqV8tRh32vBzDf2q 12xQJzpWQjD5Mpnrqlp3wtMX81Psnl-17 486859491 105707934; 2 pages.

Kohls, Search Results for "bath towel", Retrieved Aug. 5, 2011 from the Internet at: http://www.kohls.com/upgrade/webstorelhome.jsp;jsessionid=2W1QTB, 3 pages.

Lin; Wen-Shan et al., Understanding Consumer Search Activity and Online Purchase Intensions for Improving the Product Recommendation Search, 6th IEEE/ACS International Conference on Computer and Information Science, D, Apr. 2007, 6 pages.

Maldonado, Robert T., Letter to Gardella, Greg H., Re: Inventor Declarations from HUGE Inventors, Mar. 31, 2011, 2 pages.

Muspy, Artists [Online], Jan. 7, 2010, Retrieved from the Internet at: http://www.nuspy.com/artists, 2 pages.

Online Pharmacy for Prescription Drugs—CVS Pharmacy Drug Store [Online], Dec. 21, 2009, Retrieved from the Internet at http://www.cvs.com/CVSApp/user/home/home.jsp, 2 pages.

Organize.com, Kitchen, [Online], Dec. 20, 2009, Retneveti from the Internet at http://www.organize.com/kitchen.html, 4 pages.

OfficeMax, Laptop Notebook Computers: New Laptop Computers, Wireless Laptop Computers, [Online], Dec. 13, 2009, Retrieved from the Internet at: http://www.officemax.com/technology/computers/laptop-computers, 3 pages.

Pet, CSN Stores, [Online], Dec. 20, 2009, Retrieved from the Internet at http://www.csnstores.com/Pet-C216358.html, 2 pages.

"Priceless Promotions," by Samantha Murphy, Chain Store Age 84. 10 (Oct. 2008): 58.

"Processors-Desktops," http://fvvww.neweg.g.com/Store/SubCategoty.aspx? SubCategory=34 3&nam e=Processors- Desktops, at least as early as Dec. 30, 2010 (1 page).

Sam's Club, [Online], Dec. 21, 2009, Retrieved from the Internet at: http://www.samsclub.com/shopping/index.jsp, 3 pages.

Sonystyle, [Online], Dec. 13, 2009, Retrieved from the Internet at: http://www.sonystyle.com/webapp/wcs/stores/servlet/StoreCatalogDisplay?langId=-1&storeId=10151&catalogId=10551&eid=372683003, 2 pages.

Tom's Hardware Home Page: Tom'Hardware: Hardware News, Tests and Reviews, Retrieved Mar. 4, 2010 from the Internet at http://www.tomshardware.com/us/#redirect, 3 pages.

Walrnart, [Online], Dec. 21, 2009, Retrieved from the Internet at: http://www.walmart.com, 2 pages.

Yahoo! Small Business, Effective Navigation Bar Design, [Online], Dec. 21, 2009, Retrieved from the Internet at: http://sma llbusiness.yahoo.com/r- pfp-a- 40931-m-6-sc-37 -effective_navigation_bar_design.html, 1 page.

Jan. 28, 2013 Office Action, U.S. Appl. No. 12/973,651.

Mar. 18, 2013 Office Action, U.S. Appl. No. 12/887,098.

BabiesRus, Baby Gifts—Baby Registry at BabiesRus, [Online], Dec. 20, 2010, Retrieved from the Internet at: http://www.toyrus.com/registry/index.jsp, 1 page.

Crate&Barrel, [Online], Dec. 20, 2010, Retrieved from the Internet at: http://www.crateandbarrel.com/gift-registry/, 1 page.

Amazon.com, [Online], Dec. 20, 2010, Retrieved from the Internet at: http://www.amazon.com/gp/wedding/homepage/ref=sv_cm_gft_5, 1 page.

Macy's, [Online]. Dec. 20, 2010, Retrieved from the Internet at: http://macys.com/registry/wedding/registryhome, 1 page.

http://www.target.com, Target Brands, Inc., Archived on Jul. 14, 2009, retrieved from web.archive.org/web/20090714060557/http://www.target.com, p. 1-84.

Kalbach, Designing Web Navigation, O'Reily Media, Aug. 2007, pp. 73-74; p. 90.

Meloni, Sams Teach Yourself HTML and CSS in 24 Hours, 8th ed., Sams Publishing, Dec. 2009, p. 361.

Van Duyne et al., The Design of Sites: Patterns for Creating Winning Web Sites, 2nd ed., Prentice Hall, 14, Dec. 2006, p. 677-758.

Cohen, The Unusually Useful Web Book, New Riders Publishing, Jun. 2003, p. 113-114.

Eddie Baser.com [Online] Dec. 20, 2010, Retrieved from the Internet at https://www.eddiebauer.com/cheokout/bag.jsp?&categoryId=95&categoryName=SWEATERS--CARDIGANS&pCategoryId=3&pCategoryName=WOMEN&gpCategoryId=1&gpCategoryName=EB#ppl=%7Btype%3A%22transition%22%2Censembleld%3A%2236211%22%2CformatStr%3A%22product%22%2Cpassedid0bj%3A%7B%22ensembleld%22%3A%2236211%22%7D%2CategoryID%3A%2227411%22%2Cpathinfo%3A%22undefined%, 1 page.

Amazon, Search Results for Columbia 100% Towels, Retrieved Aug. 10, 2011 from Internet at: http://www.amazon.com/gp/search/ref=sr_nr_scat_10789941_ln?rh=n%3A10789941%2Ck%3Acotton+bathtowels&keywords=cotton+bath+towels&ieUTF8&qid=1312572186&scn=10789941&h=5ec5aedf63cc88fda6b27c85681ae7a21ba, 6 pages.

* cited by examiner

100

RetailStoreURL.com

✓ pros 132 cons ✗
83% 17%
134f 134g

134a — i love this camera. i think it's perfect for everything from family parties to 134b serious photography nerds. 134c
Posted by: natisnat   Overall: ★★★★☆ this camera is heavy. the user interface is not at all intuitive. 138a
Overall: ★★★★★   Posted by: Shirley 134a 134a — this is simple enough for the kids to use, while powerful enough to entertain a budding photographer. 134c
Posted by: mimi2   Overall: ★★★★☆

134a — so far, so good. it has taken a few decent drops without issue, and the photos are great. 134c
Posted by: offroad   Overall: ★★★★☆ the camera arrived damaged. i have been having a terrible time obtaining a replacement.
Overall: ★☆☆☆☆   Posted by: Mabel 134a 134a — i got to borrow this camera while on vacation, and it is on my wish list! great product. 134c
Posted by: redblu   Overall: ★★★★☆ all 28 comments       leave a comment
134d                  134e

Journal A's picks for a: 136
virtual photo booth!

flawless!

138a
Journal A says:
"Whether it's pictures of your friends or dramatic landscapes, this setup will make the most of your photos." 138b how do you use it? (9)   104

142b              142c 140  142e  all 9 photos 142a  142d check out the competition.
146a   Brand L Model B digital slr with 10.2 MP, AF-S DX   146b
99.99   146c
Reg. 129.99
144
146d   view details

FIG. 1B

RETAIL WEBSITE USER INTERFACE

CROSS-REFERENCE TO RELATED APPLICATIONS

This application claims the priority benefit of U.S. Provisional Application for Patent Ser. No. 61/435,139, entitled "Retail Website User Interface," filed on Jan. 21, 2011, which is hereby incorporated by reference in its entirety for all purposes.

BACKGROUND

A user employs a web browser to view web pages on the Internet while searching for information. Search engines allow the user to more easily find the information the user is looking for. Some search engines provide links to web pages for a specific web site and others provide links to multiple web sites. For instance, the user searches using a search engine provided by a specific web site.

A user can search for information relating to products or services in order to find out more about those products or services. The user views buying guides, FAQs, and reviews about the products or services they are looking for.

A user can purchase products or services over the Internet from an e-commerce site. Some e-commerce sites ship purchased products to customers. Some e-commerce web sites allow a user to request a service person to come to the user's home. Some e-commerce web sites allow a user to purchase a product and pick up the product at a retail store.

E-commerce web sites use servers to store web pages. A server receives a request for a web page from a user and provides the web page or information relating to the web page to the user. The server can store user account information in order to provide better service to the user.

SUMMARY

In one embodiment, a web page presented to a user includes a header section that substantially spans the top of the web page and provides a menu of selectable options as well as a search input box. A product display region may be presented below the header and display images and information about a selected product. A product carousel may be presented below the product display region and show information about other products in a horizontally scrollable list. Two columns of various types of product review information provided by sources such as professional reviewers, existing owners, and the user's friends may be displayed below the product carousel. A sortable and filterable grid of products may be displayed below the review information such that the user's attention is drawn to the variety of products available for purchase.

In some embodiments, the product carousel presents product thumbnail images that scroll around a selected product image for the selected product. Selection of one of the product thumbnail images may change the selected product image and the information presented in the product display region.

In certain embodiments, thumbnail images or other displayed elements are at least partly superimposed with one or more label elements that display additional information about the pictured items. The number of items the user currently has selected for purchase may be indicated by a label associated with an image of a shopping cart, shopping bag, or other visual cue that represents the list of items the user intends to buy.

In another embodiment, an Internet web page is laid out with a header substantially spanning the top of the web page with product category-related information directly below it. In some implementations, the product category-related information provides images and shopping advice to help the user make an informed purchase. The product category-related information may include a tri-column region in which professional advice, in the form of text, images, and multimedia, as well a collection of ranked rated products is displayed. A sorted and filtered array may be presented below the tri-column region and include selectable products shown as thumbnail images with associated textual information.

The details of one or more embodiments are set forth in the accompanying drawings and the description below. Other features and advantages will be apparent from the description and drawings, and from the claims.

DESCRIPTION OF DRAWINGS

This document describes these and other aspects in detail with reference to the following drawings.

FIGS. 1A, 1B, and 1C show three views of an example retail web page.

DETAILED DESCRIPTION OF ILLUSTRATIVE EMBODIMENTS

Figure 1A:
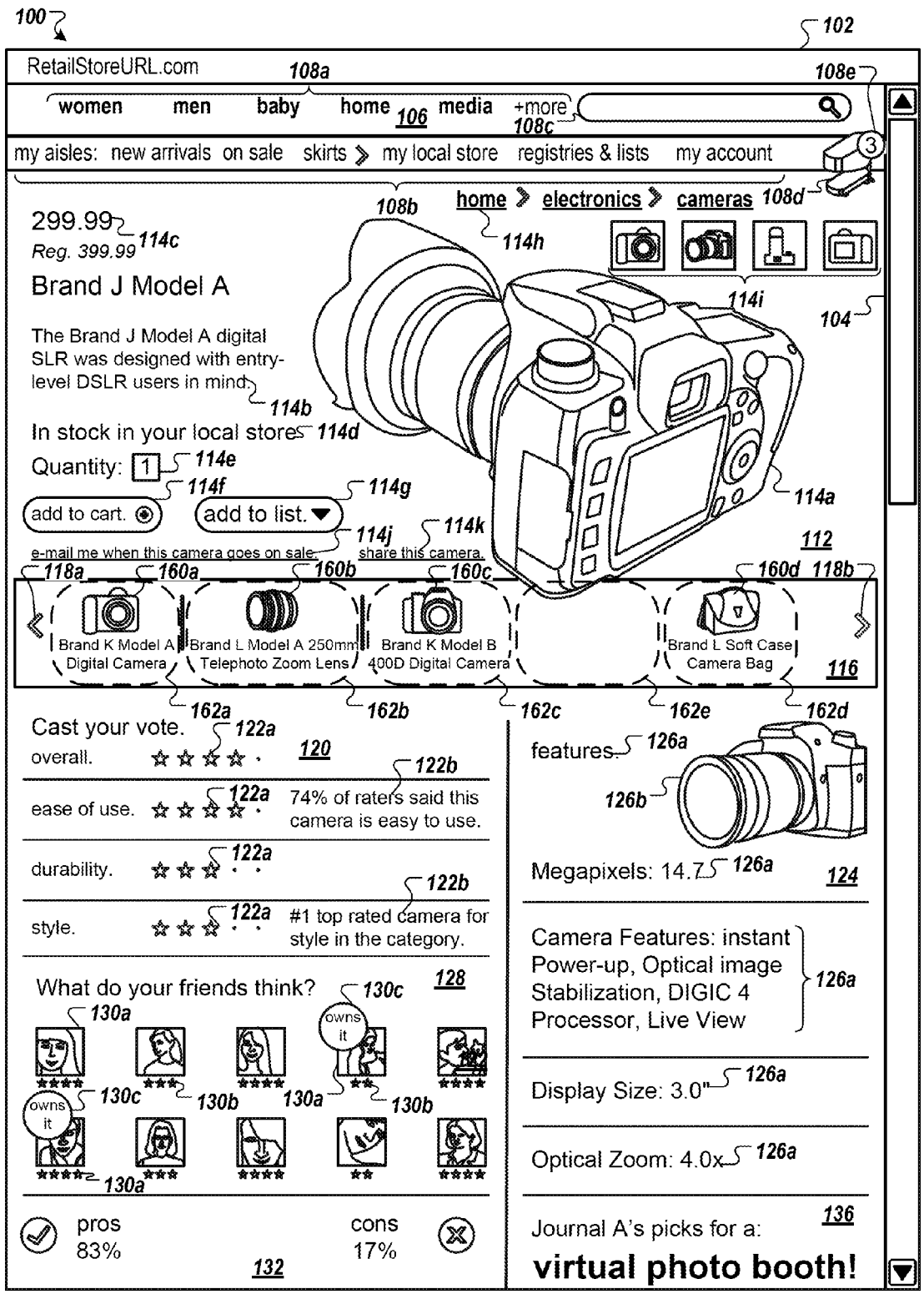
Figure 1C:
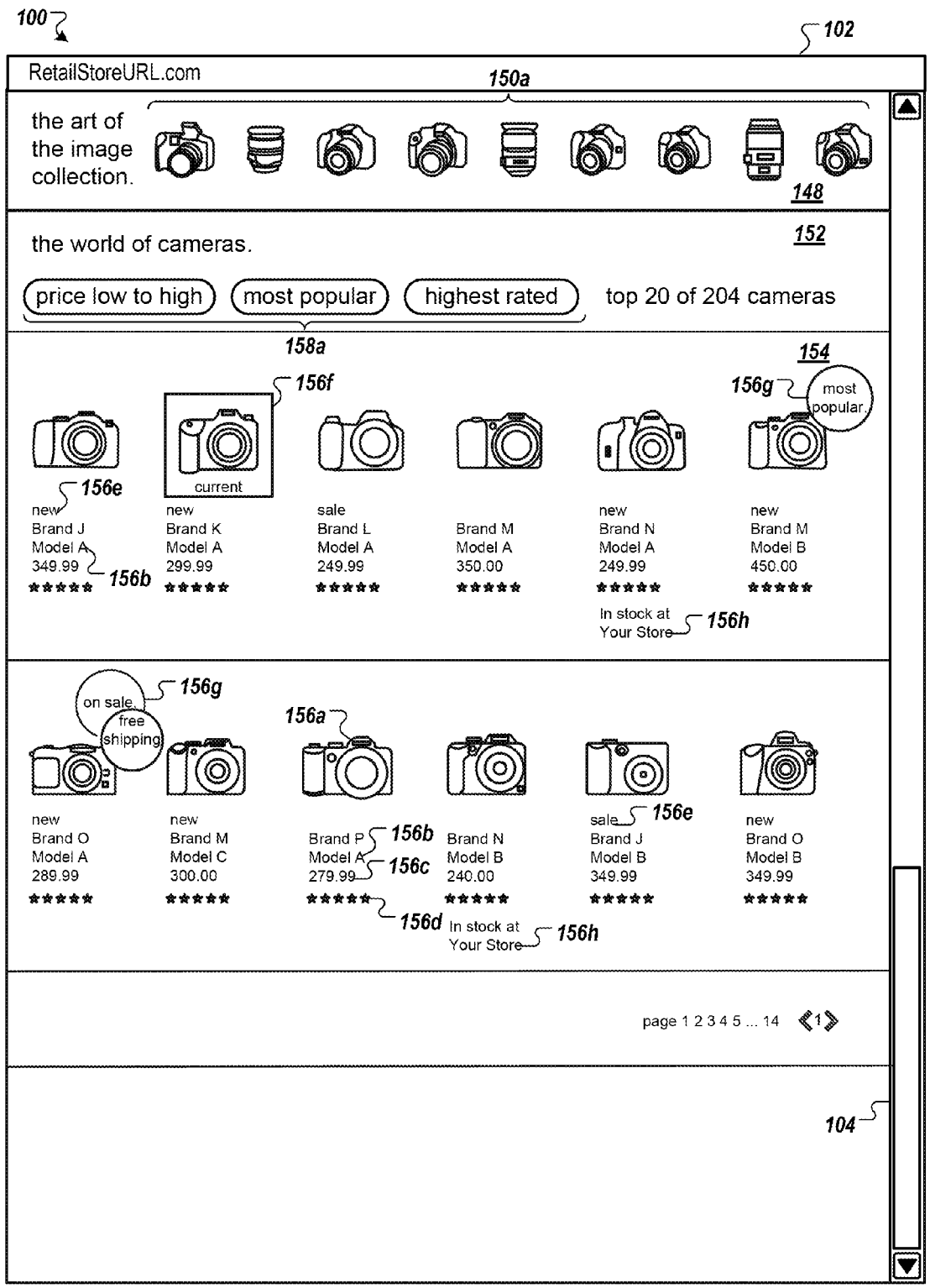

Referring to FIG. 1A, an example web page 100 is displayed in a window 102 of a screen (e.g., a computer monitor, a smartphone display, a television). In general, the web page 100 is laid out to be substantially the width of the window 102 and extends vertically. In some implementations, the web page 100 includes more information than can be conveniently displayed on the window 102 at one time. For example, a user interacts with a scroll bar 104 to shift the view of the web page 100 vertically. As can be seen in FIGS. 1A-1C, the scroll bar 104 is illustrated in three different positions, corresponding to three different vertically located views of the web page 100.

The web page 100 includes a page header 106 substantially spanning the width of the web page 100. The page header 106 includes a collection of menu items 108a and a collection of menu items 108b. In some implementations, the user selects the menu items 108a-108b to link to other web pages or to activate the display of submenu items. An example submenu will be discussed in the description of FIG. 4.

A search input box 108c is provided for users to enter search strings. For example, the user could type in keywords associated with a product he or she is seeking (e.g., "blue jeans", "frozen pizza", "batteries") to activate a search routine that helps the user find what he or she is shopping for.

A shopping cart indicator 108d is selected by the user to display a list of items the user has already selected to purchase. A quantity indicator 108e is superimposed on the shopping cart indicator 108d. The quantity indicator 108e displays the quantity of items that the user has already selected for purchase (e.g., how many items are in the user's virtual shopping cart or bag). In some implementations, the quantity indicator 108e is displayed only when the user has selected one or more items for purchase (e.g., displayed only when the virtual shopping bag has something in it).

Below the page header 106 is a product display region 112. The product display region 112 provides information that depicts and describes a selected product. The product display region 112 includes a selected product image 114a, a selected product description 114b, a selected product price 114c, a selected product availability indicator 114d, and a desired quantity input box 114e. An add to cart button 114f, when activated, causes the desired quantity of the selected product to be added to the user's shopping cart. An add to list button 114g, when activated, causes the desired quantity of the selected product to be added to a shopping list.

A hierarchical list 114h displays a hierarchy of the categories in which the selected product has been organized within the range of products available through the web page 100. One or more alternate view thumbnail images 114i display alternative views of the selected product when selected.

An email link 114j, when selected, sets an indication that the user wishes to receive an email notification when the selected product goes on sale. A sharing link 114k, when selected, causes additional user interface elements to appear that provide the user an ability to share information about the selected product (e.g., email information to a friend, post information to a blog, post information to a social network).

A product carousel region 116 includes a collection of thumbnail images 160a-d and the product names associated with the thumbnail images 160a-d. In some implementations, the thumbnail images 160a-d represent other products in the same product category as the selected product. For example, the selected product in this example is a camera and the product carousel region 116 includes other makes or models of cameras, product-specific accessories (compatible lenses or flash units), non-product specific accessories (e.g., bags, memory cards, batteries), or other products.

In some implementations, some of the products presented in the product carousel region 116 are identified based on product quality. For example, the product carousel region 116 presents thumbnail images of one or more products that cost more than the selected product. In this example, the product associated with the thumbnail image 160c costs more than the selected product.

In certain implementations, the product carousel region 116 presents products that pair well with or are complementary to the selected product and are not necessarily an accessory for the selected product. For example, when the selected product is a set of wine glasses, the product carousel region 116 includes a thumbnail image for one or more wine stain removers.

In various implementations, the products displayed in the product carousel region 116 are selected based on a user's browsing history and/or purchase history. For example, the products are selected based on the selected product displayed in the selected product image 114a and products that a user viewed during their current browsing session or a previous browsing session. The products displayed in the product carousel region 116 are selected to provide the user with alternatives and/or accessories that the user can purchase.

In one example, the product carousel region 116 displays products based on product categories instead of specific products. For example, when the selected product is a digital camera, the product carousel region 116 displays a thumbnail image for a camera carrying case. Alternatively, when the product carousel region 116 displays specific products associated with the selected product, the product carousel region 116 presents an image of a telephone zoom lens that is compatible with the currently selected digital camera.

In certain implementations, a server or another system that provides the web page 100 to a user device uses rules to identify which products to display in the product carousel region 116. For example, the rules specify one or more products, brands, or product categories that should not be displayed in the product carousel region 116 when the selected product is a certain product (i.e., the rules are associated with the certain product). In one example, when the selected product is a certain digital camera, accessories made by a competitor of the certain digital camera are not displayed in the product carousel region 116.

In another example, the rules specify products that should be presented in the product carousel region 116. For example, any time that a digital camera is presented as the selected product, an extra battery for the digital camera should be presented in the product carousel region 116 (e.g., either initially or after one or more selections of the arrow controls 118a-b).

The rules can be ranked so that none of the rules conflict. For example, when a first rule specifies that a carrying case should be presented in the product carousel region 116 and a second rules specifies that a competitor brand should not be displayed in the product carousel region 116, the second rule can have a higher rank so that only carrying cases not made by the competitor brand are displayed in the product carousel region 116.

The selected product image 114a is substantially larger than the thumbnail images 160a-d. For example, the dimensions of the selected product image 114a are substantially larger than the dimensions of each of the thumbnail images 160a-d. In one example, the dimensions of the selected product image 114a are substantially larger than the maximum dimensions of the thumbnail images 160a-d. The length and width of the selected product image 114a are substantially larger than the length and width of the largest of the thumbnail images 160a-d. In another example, when the thumbnail image 160b has the greatest width of all the thumbnail images 160a-d and the thumbnail image 160d has the greatest height, the dimensions of the selected product image 114a are substantially larger than the respective maximum width and maximum height.

In certain implementations, the aspect ratio between the height of the selected product image 114a and the height of the thumbnail images 160a-d is about 2:1 or more, preferably about 3:1 or more, more preferably about 4:1 or more. The aspect ratio can be between both the height and the width of the images. In other implementations, the aspect ratio is associated with one of the dimensions. For example, the height of the selected product image 114a is about twice the height of each of the thumbnail images 160a-d and the widths of the selected product image 114a and the thumbnail images 160a-d are about the same.

In various implementations, the file size of the selected product image 114a is substantially greater than the file sizes of the thumbnail images 160a-d. For example, the ratio of the file sizes between the selected product image 114a and the thumbnail images 160a-d is greater than 2:1.

The product carousel region 116 presents the thumbnail images 160a-d horizontally in the web page 100. In various implementations, the product carousel region 116 presents the thumbnail images 160a-d vertically. For example, the product carousel region 116 spans one third of the web page 100 and is located on the left side of the web page 100. Alternatively, the product carousel region 116 is vertical and located in approximately the center or the right side of the web page 100.

In some implementations, the product carousel region 116 includes only the thumbnail images 160a-d and does not include associated text. For example, when the web page detects a pointer positioned over one of the thumbnail images 160a-d, the thumbnail image turns over and presents text information, such as the product price and a product description. When the pointer is moved away from the thumbnail image that is turned over, the thumbnail image turns back to the product thumbnail image. Alternatively, additional information associated with a thumbnail image can be presented in a popup box when a pointer is positioned over the thumbnail image.

In certain implementations, a viewer may find the product carousel region 116 more aesthetically pleasing by viewing only product thumbnail images without text. In some implementations, turning the thumbnail images 160a-d over to present additional information increases user interaction with the thumbnail images.

A pair of arrow controls 118a-b, when activated, cause the product carousel region 116 to shift the collection of thumbnail images 160a-d to the left or right in order to display alternate product images.

The product carousel region 116 includes space that flows around the selected product image 114a, allowing the selected product image 114a to span across a portion of the product carousel region 116. For example, each of the thumbnail images 160a-d is located in a carousel tile 162a-d, respectively, in the product carousel region 116 and a carousel tile 162e in the product carousel region 116 is associated with the selected product image 114a. In this example, the product carousel region 116 includes five carousel tiles, i.e., the carousel tiles 162a-e. The carousel tiles 162a-e represent locations in the product carousel region 116 that are associated with images (e.g., thumbnail images or product images). For example, the carousel tiles 162a-e can not be seen by a user, but the images and/or other content (e.g., text) associated with the carousel tiles 162a-e are presented on the web page 100 and can be viewed by a user.

Associating the carousel tile 162e with the selected product image 114a allows the thumbnail images 160a-d to skip over the carousel tile 162e and the associated space in the product carousel region 116 when one of the arrow controls 118a-b is selected. For example, if a user selects the arrow control 118a, the thumbnail image 160d is presented on the carousel tile 162c, the thumbnail image 160c is presented on the carousel tile 162b, and so on; with the thumbnail image 160a no longer presented on the web page 100 and a new product thumbnail image presented on the carousel tile 162d.

Continuing the example, upon user selection of the arrow control 118a, the web page 100 (or code or a script associated with the web page 100) determines that the carousel tile 162d is adjacent to the carousel tile 162e associated with the selected product image 114a. The web page 100 then identifies the next carousel tile in the product carousel region 116 that is not associated with the selected product image 114a (e.g., the carousel tile 162c) and is in the direction of the selected arrow control 118a. After identifying the carousel tile 162c, the web page 100 places the thumbnail image 160d on the carousel tile 162c.

When moving the thumbnail images 160b-c, the web page 100 determines that the adjacent carousel tiles 162a-b, respectively, are not associated with the selected product image 114a and moves the thumbnail images 160b-c to the carousel tiles 162a-b respectively. Additionally, the thumbnail image 160a is removed from view and no longer presented on the web page 100.

Having the thumbnail images 160a-d skip over carousel tiles associated with the selected product image 114a (e.g., the carousel tile 162e) allows the selected product image 114a to overlap the product carousel region 116 without covering a thumbnail image 160a-d. In some implementations, presenting the selected product image 114a in the product carousel region 116 allows the product carousel region 116 to be more prominently displayed on the web page 100.

In certain implementations, the size or shape of the selected product image 114a is adjustable by a user with one or more selectable buttons. For example, the user selectable buttons can zoom, pan, and/or tilt the selected product image 114a.

Based on the size or shape of the selected product image 114a, a dynamic number of carousel tiles are associated with the selected product image 114a. For example, a larger product image is associated with more carousel tiles, e.g., three, than a smaller product image, e.g., one or two.

Alternatively, when a user selects one of the alternate view thumbnail images 114i, the number of carousel tiles associated with the selected product image 114a can change. For example, when the web page 100 presents a side view of a camera, the selected product image 114a is associated with three carousel tiles, and when the web page 100 presents a top view of the same camera, the selected product image 114a is associated with two carousel tiles.

In certain implementations, total number of carousel tiles in the product carousel region 116 remains the same and when the number of carousel tiles associated with the selected product image 114a changes, then the number of the thumbnail images 160a-d presented on the web page 100 changes. For example, if the selected product image 114 changes from a perspective view to a side view, the number of carousel tiles associated with the selected product image 114 increases from one to two. In this example, the thumbnail image 160a is removed from the web page 100, the thumbnail image 160b is associated with the carousel tile 162a, the thumbnail image 160c is associated with the carousel tile 162b, and the selected product image 114a is associated with the carousel tile 162c in addition to already being associated with the carousel tile 162e. Alternatively, when the number of carousel tiles associated with the selected product image 114a decreases, then additional thumbnail images are added to the product carousel region 116.

In some implementations, changing the size, view, pan or tilt adjusts the size of the carousel tiles associated with the thumbnail images 160a-d. For example, decreasing the size of the selected product image 114a increases the size of the thumbnail images 160a-d while the selected product image 114a remains more prominently presented on the web page 100 than the thumbnail images 160a-d.

Alternatively, when the size of the selected product image 114a changes the number of carousel tiles in the product carousel region 116 optionally changes. For example, when the size of the selected product image 114a is increased, then the number of carousel tiles in the product carousel region 116 can decrease. Alternatively, when the horizontal length of the selected product image 114a decreases, then the size of the carousel tile 162e can decrease and the number of carousel tiles in the product carousel region 116 can increase (e.g., to a new integer value).

The sizes of each of the carousel tiles 162a-e is different based on the content associated with the carousel tiles 162a-e. For example, a thumbnail image associated with a large thumbnail image or a longer text description (e.g., the thumbnail image 160b) is placed on the carousel tile 162b which is larger than the carousel tile 162a which presents a shorter text description associated with the thumbnail image 160a. Alternatively, all of the carousel tiles 162a-e included in the product carousel region 116 can have the same size.

In certain implementations, the size variation between the carousel tiles 162a-e is a change in both height and width between at least two of the carousel tiles 162a-e. For example, four of the five carousel tiles 162a-e can have the same dimensions, and the fifth carousel tile has both a shorter height and width than the other four carousel tiles.

In some implementations, only one dimension of the carousel tiles 162a-e varies. For example, all of the carousel tiles 162a-e have the same height, and at least one of the carousel tiles 162a-e has a different width than the others.

When one of the thumbnail images 160a-d is selected by a user, the selected thumbnail image is swapped with the selected product image 114a. For example, if the web page 100 detects user selection of the thumbnail image 160b, the camera (e.g., previously associated with the selected product image 114a) is presented on the carousel tile 162b and the telephoto zoom lens (e.g., previously associated with the thumbnail image 160b) is presented on the carousel tile 162e as a larger product image.

In another example, the telephoto zoom lens is presented on the carousel tile 162e as a larger product image and the remaining thumbnail images slide to adjacent carousel tiles allowing the camera to be presented as a thumbnail image in the product carousel region 116. In this example, the thumbnail image 160c is presented on the carousel tile 162b and the selected product image 114a (e.g., the previously selected "Brand J Model A" camera) is presented on the carousel tile 162c.

In some implementations, when the selected product is changed, content on the web page 100 changes. For example, the product display region 112 presents information associated with the telephoto zoom lens, such as the product price and a product description.

In another example, when the web page 100 detects a user selection of one of the thumbnail images 160a-d, a new web page is loaded and presented in the window 102. For example, a web page associated with the product presented in the selected thumbnail image is presented in the window 102 with information specific to that product.

In certain implementations, the integer number of carousel tiles associated with the product carousel region 116 changes when the selected product is changed. In various implementations, one or more thumbnail images are removed from or added to the product carousel region 116 when the selected product is changed. For example, if the previously selected product was associated with a larger image than the currently selected product, then the currently selected product is associated with fewer carousel tiles and additional thumbnail images are added to the product carousel region.

In various implementations, the selected product image 114a does not overlap the product carousel region 116. In these implementations, the product carousel region 116 includes the thumbnail images 160a-d all the way across the product carousel region 116 and each of the carousel tiles 162a-e is associated with one of the thumbnail images. For example, the product carousel region 116 includes five thumbnail images, and each of the thumbnail images is presented in one of the carousel tiles 162a-d.

When the web page 100 is loaded, all of the thumbnail images associated with the product carousel region 116 are identified. For example, thirty thumbnail images are identified that are associated with the selected product presented in the selected product image 114a. Upon repeated selection of the arrow controls 118a-b, the product carousel region 116 beings to present thumbnail images that were previously presented on the web page 100.

In one example, a minimum of six and a maximum of twelve thumbnail images are associated with the web page 100. For example, six thumbnail images are associated with the web page 100 and four of the six thumbnail images are presented as the thumbnail images 160a-d. Upon selection of the right arrow control 118b, one of the two thumbnail images not previously presented on the web page 100 is displayed on the carousel tile 162a and a first thumbnail image is removed from the web page 100 (e.g., the thumbnail image 160d).

After the web page 100 detects another selection of the right arrow control 118b, another thumbnail image is removed from the web page 100 (e.g., the thumbnail image 106c) and the last thumbnail image not previously presented on the web page 100 is displayed on the carousel tile 162a. In this example, when the web page 100 detects another selection of the right arrow control 118b, the first thumbnail image that was removed from the web page 100 (e.g., the thumbnail image 160d) is presented on the web page 100 on the carousel tile 162a.

In other implementations, the thumbnail images presented in the product carousel region 116 are loaded dynamically to reduce the possibility of the same thumbnail image being presented in the product carousel region 116 more than once. For example, based on user interaction with the thumbnail images 160a-d, the web page 100 dynamically identifies a new thumbnail image when one of the arrow controls 118a-b is selected.

A voting region 120 provides a collection of ratings controls 122a that the user manipulates to provide opinions about the selected product in various categories (e.g., overall, ease of use, durability, style). Statistical elements 122b optionally display statistical information about the selected product as rated by a larger population of voters (e.g., popularity rank, exceptionally high or low ratings in a particular category).

A features region 124 includes textual information 126a as well as an image 126b of the selected product. For example, the textual information 126a provides information about the selected product's physical attributes (e.g., size, weight) or capabilities (e.g., in the example of a camera, zoom power, resolution, color display).

A friends region 128 displays an array of thumbnails 130a. Each of the thumbnails 130a represents a friend of the user. In some implementations, the array of thumbnails 130a includes those friends of the user who have expressed a rating or other opinion of the selected product. In some implementations, the friends represented by the thumbnails 103a are persons associated with the user through a social networking service (e.g., Facebook by Facebook, Inc. of Palo Alto, Calif., MySpace by News Corp. Digital Media of Beverly Hills, Calif.), or a contact list (e.g., email addresses, instant messenger contacts). Associated with each of the thumbnails 103a is a rating indicator 103b. The rating indicator 103b displays the friend's rating of the selected product. A balloon indicator 130c is partly superimposed over none, some, or all of the thumbnails 103a to display additional information. For example, the balloon indicator 130c displays "owns it" for friends who have indicated that they own the selected product.

In some implementations, when the selected product presented on the web page 100 changes, alternative content is presented on the web page 100. For example, the voting region 120, the features region 124, and/or the friends region 128 presents information associated with the new product presented in the selected product image 114a.

Referring to FIG. 1B, a comments region 132 includes a collection of customer comments. Each customer comment includes a photo thumbnail 134a, a comment block 134b, and a rating indicator 134c associated with a customer. For example, when a customer chooses to leave a comment and rating for the selected product, other shoppers see the customer's image, comment, and rating when looking at the same selected product. A link 134d, when selected, causes all customer comments associated with the selected product to be displayed. A link 134e, when selected, causes an interface to be displayed in which the user can leave a comment about the selected product. A percentage indicator 134f displays a percentage representing the number of customers who have given the selected product a favorable rating, while a percentage indicator 134g displays a percentage representing the number of customers who have given the selected product an unfavorable rating.

A professional review region 136 displays information obtained from professional reviews of the selected product, including a collection of images 138a and a text block 138b in which the reviewers' photos and comments about the selected product are displayed.

Usage region 140 displays images, such as an image 142a, that depict the selected product in use (e.g., photos taken with a selected camera, a selected sweater being modeled, a selected baseball bat being played with). A rewind control 142b and an advance control 142c, when selected, cause the previous or next photo in a collection of images to be displayed as the image 142a. A preference control 142d, when selected, lets the user indicate whether he or she likes or dislikes the image 142a. A link 142e, when selected, causes all the images in the collection of images to be displayed.

A competing product region 144 displays information about a product that is a marketplace competitor to the selected product. The information includes an image 146a, a quick description block 146b, a price indicator 146c, and a link 146d to view more details about the competing product. In some implementations, by selecting the link 146d, the competing product becomes the selected product in the web page 100.

In some implementations, when a user selects a new product in the product carousel region 116, content presented on the web page 100 is adjusted to reflect the new product selection. For example, alternate comments and/or reviews are presented in the comments region 132 and the professional review region 136 respectively. In certain implementations, images presented in the usage region 140 and/or a product presented in the competing product region 144 are adjusted to reflect the new product presented in the selected product image 114a.

In certain implementations, when the selected product changes, the web page 100, or code or a script associated with the web page 100, perform a partial refresh of the content presented in the web page 100. For example, information presented in the product display region 112 changes, and content presented in the professional review region 136 remains the same. In this example, some of the frames or regions included in the web page 100 change while others remain the same.

A featured collection region 148, shown in FIG. 1C, displays a collection of thumbnail images 150a for featured products in substantially the same category as the selected product.

A product selection region 152 and a product browsing region 154 provide controls that can be selected by the user to look at substantially all of the products available in the selected product's category. The product browsing region 154 displays an array of product images 156a, product descriptions 156b, prices 156c, and ratings indicators 156d. Some of the product descriptions 156b include an additional information indicator 156e. For example, products that have recently been added to the collection display words or phrases such as "new" or "just arrived" as the additional information indicator 156e, or products on sale display words or phrases such as "sale", "on sale", "save $10", or "half off" as the additional information indicator 156e.

If the selected product is also displayed in the collection region 148, a current status indicator 156f highlights the selected product in the collection. In some implementations, when the user selects a different item in the collection, the selection of that item is reflected by the current status indicator 156f highlighting the different product.

Some, all, or none of the product images are at least partly superimposed with one or more indicators 156g. In some implementations, the indicators 156g are used to draw the user's attention to particular items in the collection, such as items that are on sale, are on clearance, have newly arrived, receive free shipping, are available for pre-order, are most popular, have been recently discounted, or have other attributes that are to be brought to the user's attention. Some products displayed in the product selection region are also displayed with an availability indicator 156h. For example, if the product is available at a local retail outlet, then the availability indicator 156h is made visible to the user and displays a message such as "In stock at your local store".

The product selection region 152 includes a collection of sorting and filtering controls 158a. By selecting various ones of the filtering controls 158a the user is able to alter the order in which items appear in the product browsing region 154 (e.g., priced low to high, priced high to low, alphabetically, ranked by popularity), or the user is able to control the subset of products displayed (e.g., members of a subcategory, only items that have been professionally reviewed, only items on sale).

Figure 2A:
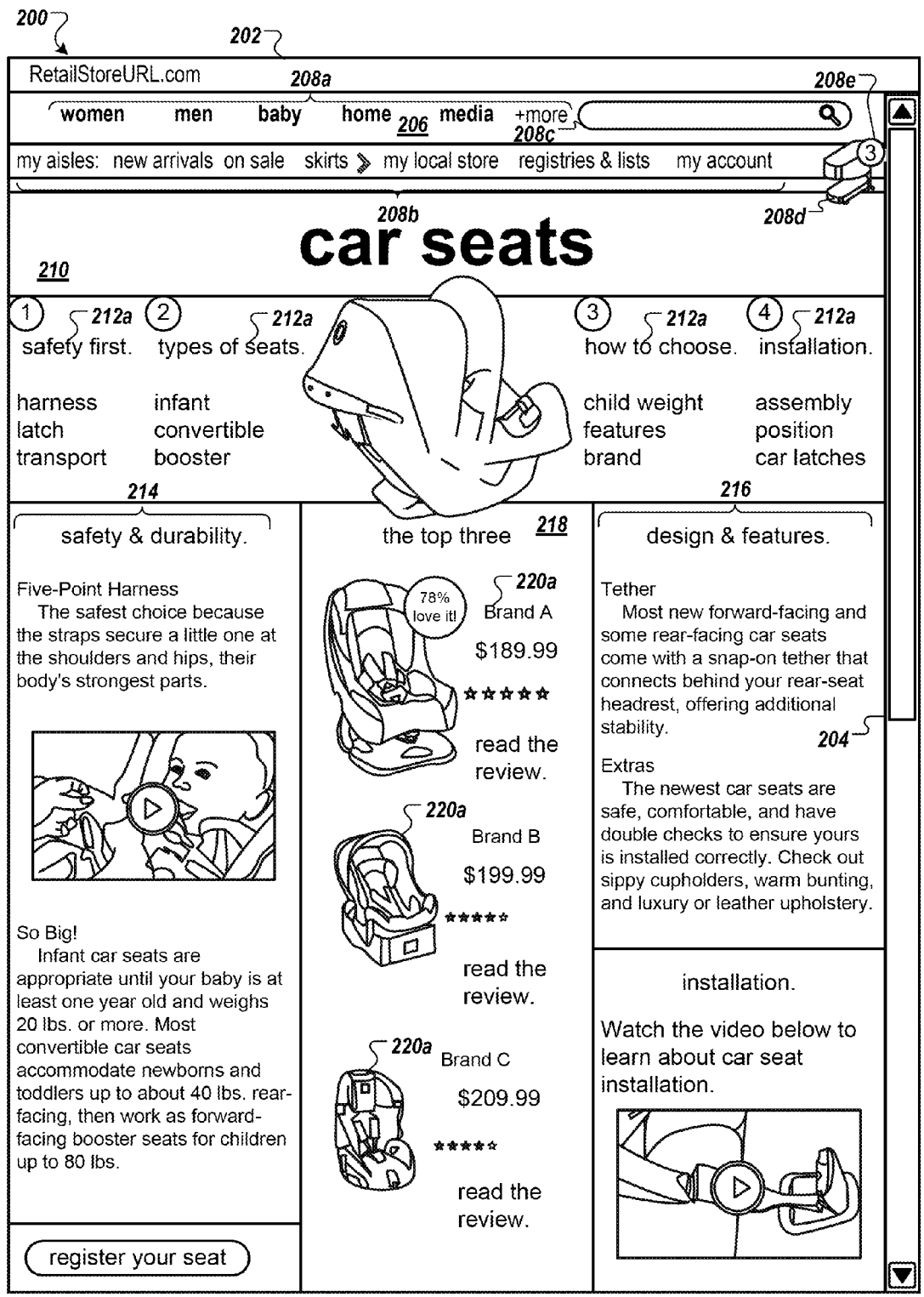
FIGS. 2A and 2B show two views of another example retail web page.
Figure 2B:
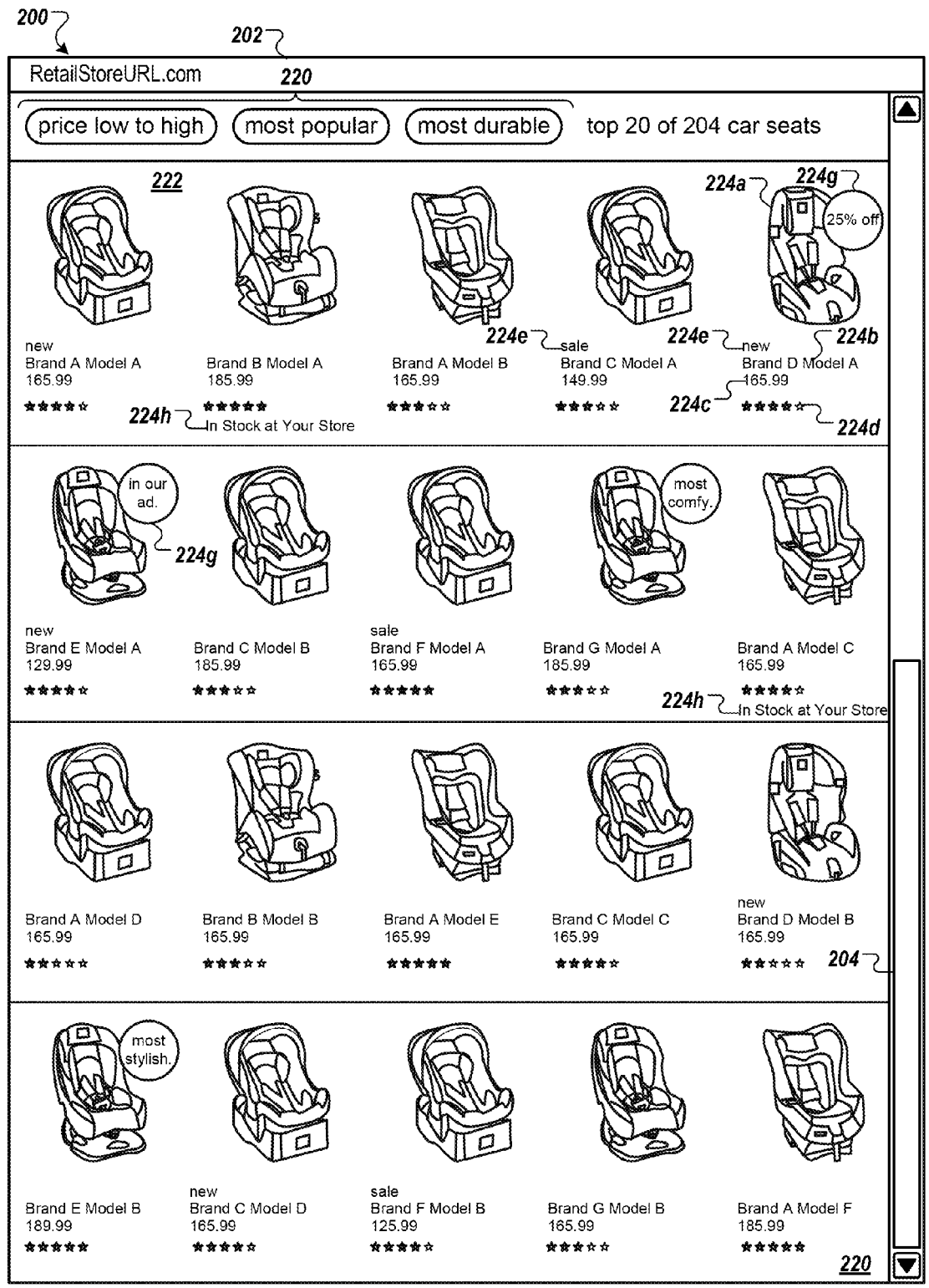

Referring now to FIGS. 2A and 2B, a web page 200 is displayed in a window 202 of a screen or display. In general, the web page 200 is laid out to be substantially the width of the window 202 and extends vertically. In some implementations, the web page 200 includes more information than can be conveniently displayed on the window 202 at one time. For example, a user uses a scroll bar 204 to shift the view of the web page 200 vertically. As can be seen in FIGS. 2A and 2B, the scroll bar 204 is illustrated in two different positions, corresponding to two different vertically located views of the web page 200.

The web page 200 includes a page header 206 substantially spanning the width of the web page 200. The page header 206 includes a collection of menu items 208a and a collection of menu items 208b. In some implementations, the user is able to select the menu items 208a-208b to link to other web pages or to activate the display of submenu items. An example submenu will be discussed in the description of FIG. 4.

A search input box 208c is provided for users to enter search strings. For example, the user types in keywords associated with a product he or she is seeking (e.g., "pencils", "car seats", "vacuum cleaners") to activate a search routine that helps the user find what he or she is shopping for.

The user selects a shopping cart indicator 208d to display a list of items the user has already selected to purchase. A quantity indicator 208e is superimposed on the shopping cart indicator 208d. The quantity indicator 208e displays the quantity of items that the user has already selected for purchase (e.g., how many items are in the user's virtual shopping cart or bag). In some implementations, the quantity indicator 208e is displayed only when the user has selected one or more items for purchase (e.g., displayed only when the virtual shopping bag has something in it).

Below the page header 206 is a category description region 210. Generally speaking, the category description region 210 provides images and text that describe a product category.

The category description region 210 includes a collection of shopping tips 212a. In some implementations, the shopping tips 212a provide advice that the user can consider when deciding which product to purchase from the displayed category of products.

A professional advice region 214 and a professional advice region 216 are located below the category description region 210. In some implementations, the professional advice regions 214-216 display text, images, and/or multimedia content from authoritative sources. For example, if the web page 200 generally displays information about infant car seats, then the professional advice regions 214-216 include information such as articles or videos from third party resources such as parenting magazines and websites.

A featured products region 218 is located below the category description region 210 and between the processional advice regions 214-216. The featured products region 218 displays a collection of featured products 220a that, in some implementations, can include thumbnail images, names, prices, ratings, or other information about featured products in the product category generally displayed by the web page 200. For example, the featured products region 218 displays the five most highly rated products in the current product category.

Referring now to FIG. 2B, the web page 200 includes a collection of sorting and filtering controls 220. By selecting various ones of the filtering controls 220 the user is able to alter the order in which items appear in a product browsing region 222 (e.g., priced low to high, priced high to low, alphabetically, ranked by popularity), or the user is able to control the subset of products displayed (e.g., members of a subcategory, only items that have been professionally reviewed, only items on sale).

The product browsing region 222 provides controls that can be selected by the user to look at substantially all of the products available in the selected product's category. The product browsing region 222 displays an array of product images 224a, product descriptions 224b, prices 224c, and ratings indicators 224d. Some of the product descriptions 224b include an additional information indicator 224e. For example, products that have recently been added to the collection display the word "new" as the additional information indicator 224e, and products on sale display "sale" as the additional information indicator 224e.

Some, all, or none of the product images are at least partly superimposed with one or more indicators 224g. In some implementations, the indicators 224g draw the user's attention to particular items in the collection, such as items that are on sale, are highly rated, are featured in recent advertisements, receive free shipping, are available for pre-order, are most popular, have been recently discounted, or otherwise have attributes that are to be brought to the user's attention. Selected products displayed in the product selection region are also displayed with an availability indicator 224h. For example, if the product is available at a local retail outlet, the availability indicator 224h will be visible to the user and display a message such as "In stock at your local store".

Figure 3:
FIG. 3 shows an example of a personalized retail web page.

Referring now to FIG. 3, a web page 300 is displayed in a window 302. The web page 300 includes a page header 306 that is substantially similar to the page headers 106 and 206 of FIGS. 1A and 2A. Below the page header 306 is personalized region 310. In some implementations, the personalized region 310 includes messages and information that reflects the user's identity, the user's account information, information determined implicitly or explicitly about the user, or other information that is used give the user a more personalized shopping experience. For example, the personalized region 310 includes a personal greeting 312a, localization information 312b, and pending order information 312c.

Below the personalized region 310 is a product carousel region 316. The product carousel region 316 includes a collection of thumbnail images and product names 318a. In some implementations, the thumbnail images and product names 318a represent products that are of potential interest to the user. For example, the product carousel region 316 includes a collection of products that are similar or complementary to products the user has previously browsed or purchased. A pair of arrow controls 318b, when activated, cause the product carousel region 316 to shift the collection of thumbnail images and product names 318a to the left or right in order to display additional product selections. A cart control 318c, when selected, links the user to a web page that displays a list of products the user has previously selected for purchase. A published ad control 318d, when selected, causes a substantial equivalent of the current local print ad to be displayed.

An aisles region 320, a lists region 322, a store region 324, a sales and coupons region 326, and a weekly ad region 328 are located in a row below the product carousel region 316. The aisles region 320 provides links to product categories that are of potential interest to the user. For example, the aisles region 320 displays links to product categories that the user has recently browsed or purchased from. The lists region 322 provides links to the user's lists, such as the user's wedding registry, a friend's baby registry, or other shopping lists. The store region 324 provides links to information about the user's local retail store. For example, the store region 324 includes links to the local store's weekly ad, driving directions, the store's floor plan, or other information. The sales and coupons region 326 provides links to discounts and other offers for various products. The weekly ad region 328 provides links to and relating to the store's weekly ad for the user's geographical location. For example, the user is able to click to see the weekly ad, send the ad to the user's phone, subscribe to electronic ad publications, or other information relating to advertisements.

A collection of marketing regions 330, 340, 350, and 360 are located below the row of aisles regions 320-328. Each of the marketing regions 330-360 include marketing messaging that provides a brand experience, for example, through visually clean, timely promotions and offers that are potentially relevant to the user.

Figure 4:
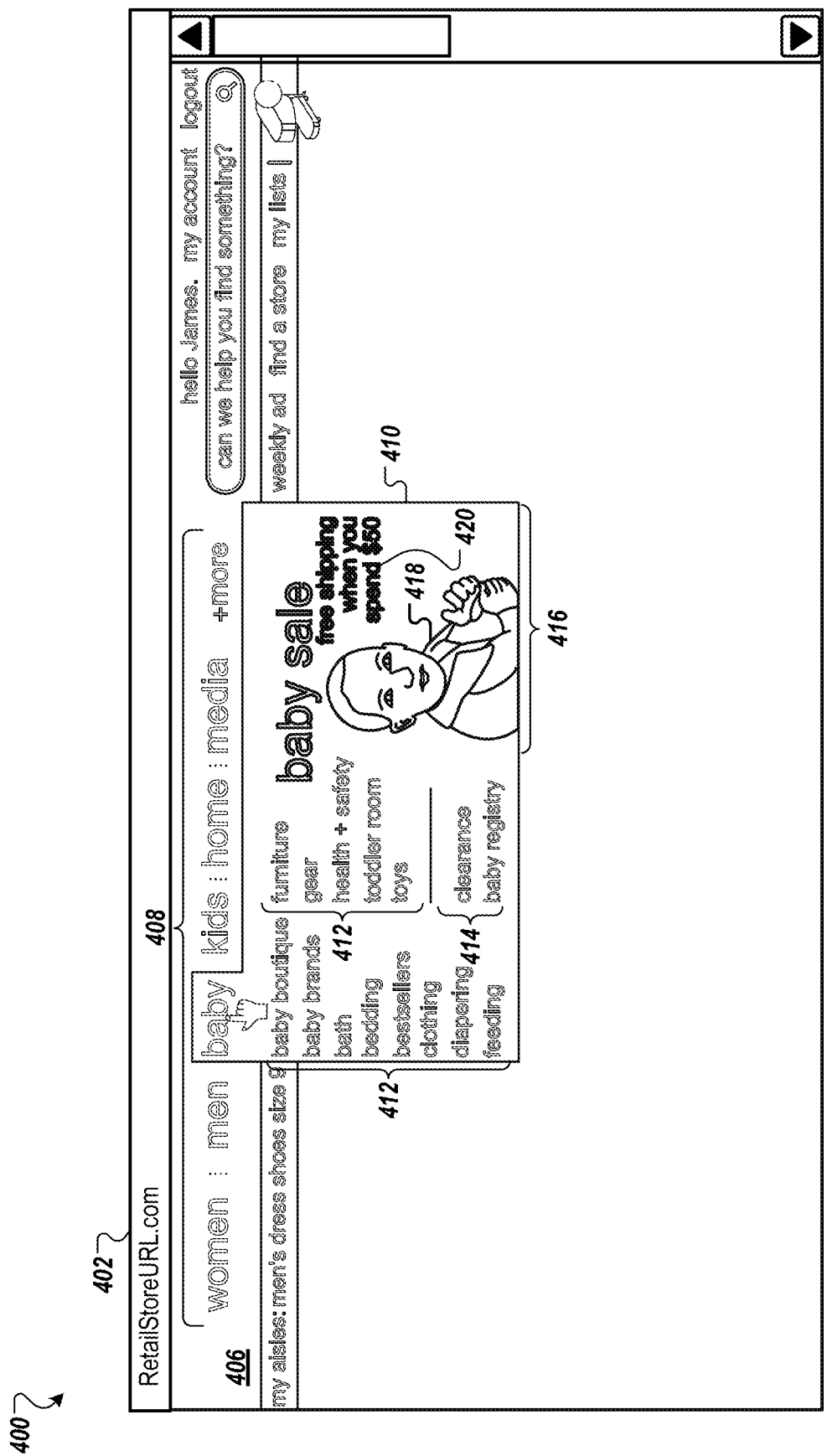
FIG. 4 shows an example retail web page header section.

Referring now to FIG. 4, a web page 400 is shown displayed in a window 402 of a screen or other display. The web page 400 includes a page header 406 that is substantially similar to the page headers 106, 206, and 306. The page header 406 includes a collection of menu items 408. In some implementations, the user selects the menu items 408 to link to other web pages or to activate the display of submenu items. In the illustrated example, the user has selected one of the collection of menu items 408, and in response to the selection, a submenu 410 is displayed as a drop-down menu.

The submenu 410 includes a collection of subcategory items 412. In some implementations, the collection of subcategory items 412 provide links that let the user quickly navigate to various groupings of products that the user is shopping for. In the illustrated example, the user has selected a "baby" category and, in this example, the subcategories include bath items, bedding, diapers, food, and other such baby-related product categories. The submenu 410 also includes a collection of links 414 that, when selected, hyperlink the user to other web pages that are related to the selected product category. In the example of the baby category, the collection of links 414 includes links to items such as baby clearance items or a baby registry page.

The submenu 410 also includes a marketing space 416. The marketing space includes one or more images, such as the image 418, and/or the text 420. In some implementations, the marketing space 416 uses the image 418 and/or the text 420 to display marketing or monetization messages that are related to the selected category. Referring again to the example of the selected "baby" category, the marketing space 416 displays an announcement for a category-specific promotion such as free shipping when the user spends more than a predetermined amount on products in the selected category.

Figure 5:
FIG. 5 shows another view of an example retail web page.

Referring now to FIG. 5, a web page 500 includes a search header 502. Below the search header 502 is search results region 504, including a series of thumbnail product images 508a through 508g with associated product information 510a through 510g, and a search narrowing region 506. The items displayed in the thumbnail product images 508a through 508g, for example, show a portion of search results received in response to a query for "Designer A" that has been submitted to a search input box 512 in the search header 502. A balloon indicator is partly superimposed over none, some, or all of the product images 508 to display additional information. For example, a balloon indicator 509 displays "30% off," alerting the viewer to the fact that the product displayed in product image 508f is on sale.

The query used to produce the list of search results, for example, is typed into the search input box 512 or selected from a list of suggested searches 511 (e.g., most popular searches or recent searches) or a list of related searches 513 (e.g., keywords commonly correlated with one or more keywords last submitted in the search input box 512). In some implementations, the list of suggested searches 511 includes information relevant to the particular user. For example, the list of suggested searches 511 is based in part upon one or more factors such as the purchasing history of the user, the purchasing history of other users related to the user, the browsing history of the user, and the search input history of the user.

In the search results region 504, a designer information region 514 includes information regarding the designer "Designer A," including a name and a photographic image. In some implementations, selection of the designer information region 514 provides the user with further information regarding the designer.

A user rearranges the search results presented in the search result region 504 by designating a results ranking method using a sort selection drop-down menu 516. For example, the selection "sort by relevance" is currently active in the sort selection drop-down menu 516. In some further examples, the sort selection drop-down menu 516 includes cost, user rating, and popularity.

Although the search results displayed in the search result region 504 are arranged in rows with four products per row, in some implementations, the user has the option of rearranging the search results into alternative search result layouts using a view layout control 517. For example, the user can select a list view, a grid view, or a comparison view through the view layout control 517.

In some implementations, the user chooses to filter the search results presented in the search results region 504 using one or more of the tools presented in the search narrowing region 506. As illustrated, a set of product categories 518 present the user with selectable options for narrowing the search results by product category, including a clothing category 518a, an accessories category 518b, a cosmetics category 518c, or a shoes category 518d. If the user has already narrowed the search results to a particular category, the user selects an all categories option 520 to once again view search results related to all product categories.

A price selection control 522 can be selected by the user to narrow the search results to a range of prices (e.g., $0 to $100, $40 to $80, etc.). The price selection control 522, in some implementations, varies in price range depending upon the price range available in the search results presented in the search results region 504.

A series of size selection controls 524 offers the user the opportunity to filter the search results to a particular garment size or range of garment sizes. In some implementations, the size selection controls 524 are activated upon selection of a relevant category. For example, once a user has selected either the clothing category 518a or the shoes category 518d, the size selection controls 524 are activated. The user then selects one or more of the size selection controls 524. After the user has narrowed the search results to one or more sizes, the user has the option to revert to a view of all available sizes using a clear sizes control 526.

A color selection control 528 provides the user with the opportunity to narrow the search results to one or more colors. For example, the user chooses a red box within the color selection control 528 to view only the red products within the search results presented in the search result region 504.

The search results region 504 includes a collection of additional resources links 530 associated with the search query entered in the search input box 512. As illustrated, the query "Designer A" has been associated with the following additional resource links: "Designer A in wedding registries," "Designer A in buying guides," "Designer A in lists," and "Designer A help or frequently asked questions." Each link, when selected, provides the user with one or more resources. A "see more" control 532, when selected, provides one or more further additional resource links 530.

In various implementations, the aspect ratio (height to width) of the web page is substantially greater than 1:1. In the example of FIGS. 1-2, the aspect ratio is about 3:1 or 4:1. In other embodiments, the aspect ratio is about 2:1 to about 10:1, more preferably about 3:1 to about 7:1, and even more preferably about 4:1 to about 6:1, and in one preferred embodiment about 5:1.

In various implementations, rich content is positioned "below the fold," or below the bottom of the screen as the webpage is initially displayed to a user. FIGS. 1B, 1C, 2B and 2C depict content that is displayed below the fold, or below the bottom edge of the display of FIGS. 1A and 2A, respectively. The content displayed below the fold can be selected so as to draw consumers' attention below the fold. For instance, the thumbnail product arrays in FIG. 1 may encourage a consumer to scroll down, below the fold, if the consumer is looking primarily to review the products displayed in the thumbnail array. Such an approach can, in certain embodiments, have the effect of rendering the middle and bottom portions of the page more usable or valuable including in the sense that those regions will more likely be viewed by consumers.

The "fold" on a page will often be a function of the aspect ratio of the monitor on which the web page is displayed. The depicted displays have an aspect ratio of about 1:1. Monitors typically have an aspect ratio of about 1:1 or less, sometimes about 3:2 for wide-screen monitors.

Figure 6:
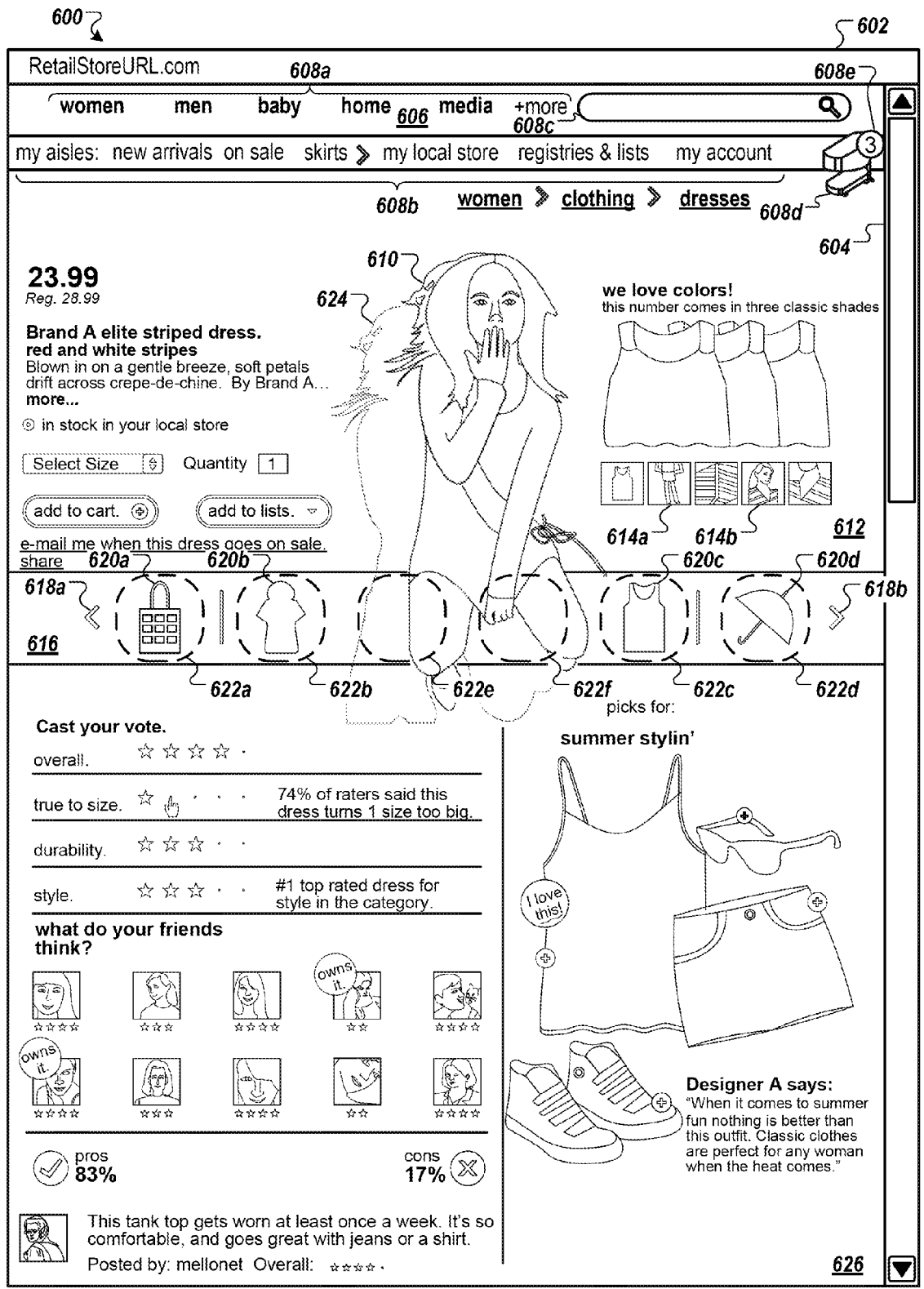
FIG. 6 shows another view of an example retail web page.

FIG. 6 shows another view of an example web page 600 displayed in a window 602 of a screen. In general, the web page 600 is laid out to be substantially the width of the window 602 and the web page 600 extends vertically. In some implementations, the web page 600 includes more information than can be conveniently displayed on the window 602 at one time. For example, a user interacts with a scroll bar 604 to adjust the view of the web page 600 vertically.

The web page 600 includes a page header 606, a plurality of menu items 608a-b, a search input box 608c, a shopping cart indicator 608d, and a quantity indicator 608e similar to those described above.

A selected product image 610 is presented on the web page 600. For example, a user of the web page 600 conducts a search or browses products and selects a product associated with the selected product image 610.

A product display region 612 presents information associated with the selected product. For example, the product display region 612 includes a description of the selected product, and the price of the selected product. The product display region 612 optionally includes one or more buttons or selectors to change the color of the selected product as presented in the selected product image 610, a quantity of the selected product to add to a shopping cart, and/or add the selected product to a wish list or gift registry.

The product display region 612 includes an add to cart button that adds the selected product to a user's shopping cart. For example, after selecting the add to cart button, when the user selects the shopping cart indicatory 608d, the web page 600 presents information associated with the user's shopping cart. Alternatively, the window 602 presents an alternate web page with the user's shopping cart information.

One or more alternate view thumbnail images 614a-b can be selected by a user to change the selected product image 610 based on the alternate view thumbnail image 614a-b selected. For example, the alternate view thumbnail images 614a-b include an image of a dress, an image of a model wearing the dress, and a close-up image of the model wearing the dress. Selection of one of the alternate view thumbnail images 614a-b can change the size and/or shape of the selected product image 610.

The web page 600 includes a product carousel region 616 that presents images of products or services associated with the selected product. For example, when the selected product is a dress, the product carousel region 616 presents alternate dresses or accessories a user may purchase.

In some implementations, the alternate products are selected based on the product category of the selected product. In certain implementations, the alternate products are selected based on user reviews of products. For example, when a specific user highly rated the selected product, then the product carousel region 616 can present other products that are also highly rated by the specific user or other users with similar interests.

The product carousel region 616 includes two arrow controls 618a-b and a plurality of product thumbnail images 620a-d. The plurality of product thumbnail images 620a-d are images of the complementary products or services associated with the selected product and presented in the product carousel region 616.

When the web page 600 detects user selection of the left arrow control 618a, the product thumbnail image 620a is removed from the web page 600, the product thumbnail images 620b-d shift to the left, and a new product thumbnail image is placed in the location previous occupied by the product thumbnail image 620d. Alternatively, when the web page 600 detects user selection of the right arrow control 618b, then the product thumbnail images 620a-d shift to the right.

Upon selection of one of the arrow controls 618a-b, the selected product image 610 does not change. For example, the selected product image 610 spans across the product carousel region 616 and does not change with user selection of either of the arrow controls 618a-b.

Placement of the selected product image 610 in the product carousel region reduces the space in the product carousel region 616 for the product thumbnail images 620a-d, The product carousel region 616 includes an integer number of locations or tiles for presentation of images or that are associated with an image. For example, the product carousel region 616 includes six carousel tiles 622a-f so six or fewer images can be presented in the product carousel region 616 at the same time. In one example, an integer number of carousel tiles, such as between one and three, are associated with the selected product image 610. When the number of carousel tiles associated with the selected product image 610 is greater than one, the number of images presented in the product carousel region 616 is fewer than six.

Each of the product thumbnail images 620a-d is associated with one of the carousel tiles 622a-d respectively and the selected product image 610 is associated with the carousel tiles 622e-f. The number of carousel tiles associated with the selected product image 610 can change based on the size, shape, and/or orientation of the selected product image 610.

Upon user selection of one of the arrow controls 618a-b, the product thumbnail images 620a-d move to a carousel tile adjacent to the carousel tile 622a-d the product thumbnail images was associated with before the selection of the arrow control. For example, the product thumbnail image 620a would be presented on the carousel tile 622b after selection of the right control arrow 118b.

When a product thumbnail is adjacent to the selected product image 610 and the selected arrow control indicates that the product thumbnail should be presented on a carousel tile associated with the selected product image 610, then the product thumbnail image jumps across the carousel tiles associated with the selected product image 610 and is presented on the carousel tile on the opposite side of the selected product image's carousel tiles from the carousel tile the product thumbnail image was previously presented on.

For example, when the user selects the right arrow control 618b, the product thumbnail image 620b is not presented on the carousel tiles 622e-f, but is presented on the carousel tile 622c.

When the orientation, shape, or size of the selected product image 610 changes, the number of the carousel tiles 622e-f associated with the selected product image 610 or the size of the carousel tiles 622e-f changes. For example, when the width of the selected product image 610 changes (e.g., by panning, tilting, zooming or selecting an alternate view or product), the size of the carousel tiles 622e-f changes respectively and then the size of the product thumbnail images 620a-d and the carousel tiles 622a-d changes. For example, when the size of the selected product image 610 increases, then the size of each of the product thumbnail images 620a-d decreases. Alternatively, when the size of the selected product image 610 decreases, then the size of each of the product thumbnail images 620a-d increase while the selected product image 610 remains prominently displayed on the web page 600.

In some implementations, the placement of the selected product image 610 in the product carousel region 616 is determined based on the size, shape, and/or orientation of the selected product image. For example, when the selected product image 610 is vertical and narrow, then the selected product image 610 can be placed more to one side of the product carousel region 616 compared to a selected product image that is more horizontal and wider, which would be place in a more central region of the product carousel region 616.

In certain implementations, the different locations of the selected product image 610 in the product carousel region 616 change the type and location of content presented in the product display region 612. For example, a larger selected product image can be placed closer to a vertical edge of the product carousel region 616 and have less associated content presented in the product display region 612 compared to a narrower selected product image.

When the web page 600, or code or a script associated with the web page 600, detects a user selection of one of the product thumbnail images 620a-d, then the previously selected product image becomes a product thumbnail image and the newly selected product thumbnail image becomes the selected product image. For example, the size of the previously selected product image is scaled down to the size of a product thumbnail image while remaining in the same approximate location in the product carousel region 616. The size of the newly selected product thumbnail image is scaled up to the size of a selected product image while staying in the same approximate location in the product carousel region 616.

For example, the web page 600 detects a user selection of the product thumbnail image 620a. The web page 600 dynamically removes the association between the selected product image 610 and the carousel tile 622e while keeping the association between the selected product image 610 and the carousel tile 622f and the web page 600 scales the selected product image 610 to a product thumbnail size. The product thumbnail image 620b is associated with the carousel tile 622e, and the carousel tile 622b is associated with the product thumbnail image 620a. The product thumbnail image 620a is scaled to a selected product image size and is associated with two carousel tiles (e.g., the carousel tiles 622a-b), and the product display region 612 presents product information for the newly selected product.

Alternatively, the selected product image 610 is presented in the carousel tile 622a and the product thumbnail image 620a is presented in the carousel tiles 622e-f while the product display region 612 refreshes and presents information for the newly selected product. In another implementation, the product thumbnail image 620a is presented in the carousel tiles 622e-f, the selected product image 610, as a product thumbnail image, is presented in the carousel tile 622b, and the product thumbnail image 620b is presented in the carousel tile 622a.

In some implementations, when the selected product changes, the web page presented in the window 602 changes. For example, when the web page 600 detects user selection of the product thumbnail image 620a, the web page 600 redirects a browser presenting the web page in the window 602 to a new web page associated with the product thumbnail image 620a. In this example, a new web page is loaded with new content associated with the newly selected product.

In certain implementations, user selection of one of the arrow controls 618a-b changes the image presented as the selected product image 610. For example, when the right arrow control 618b is selected, the product thumbnail image 620d is removed from the web page 600, the thumbnail image 620c is presented in the carousel tile 622d, the selected product image 610 is presented in the carousel tile 622c as a thumbnail image, the product thumbnail image 620b is presented in the carousel tiles 622e-f as a larger product image, and so on.

In this example, the content presented on the web page 600 outside of the product carousel region 616 does not change and is grayed out (i.e., a user cannot select or interact with content on the web page 600 outside of the product carousel region 616). In one example, part or all of the content on the web page 600 that is outside of the product carousel region 616 is refreshed instead of graying out. In another example, a new web page associated with the product presented in the carousel tiles 622e-f is loaded in the window 602. In this example, the products presented in the product carousel region 616 remain the same. Alternatively, new products can be identified and associated thumbnail images presented in the product carousel region of the new web page.

In the example where content outside of the product carousel region 616 is grayed out, upon user selection (e.g., a pointer selection) of the new product presented in the carousel tiles 622e-f, the web page 600 presents content associated with the new product. For example, the web page 600 loads new content for regions of the web page 600 specifically associated with the new product (e.g., the product display region 612). Alternatively, a new web page is loaded in the window 602 and the new web page presents information associated with the new product.

In various implementations, when the content outside of the product carousel region 616 is grayed out, the web page 600, or a script or code associated with the web page 600, monitor a timer and, upon expiration of the timer, content associated with the new product is loaded in the web page 600.

When content outside of the product carousel region 616 is grayed out, a user can interact with the new product image presented in the carousel tiles 622e-f without selecting the new product associated with the new product image. For example, positioning a pointer over the new product image can present user ratings or product information associated with the new product. Sometimes, interaction with the new product image presents social network information. For example, the web page 600 presents ratings and comments from people socially connected to a user viewing the web page 600. Additionally, user interaction with the new product image can present product availability information, an add to cart selection, and/or other information associated with the new product.

In some implementations, the selected product image 610 includes a product shadow 624. The product shadow 624 overlaps and partially covers content on the web page 600. For example, the product shadow 624 partially covers the product_carousel region 616 and the product display region 612. The opacity and/or grayscale of the product shadow 624 are selected to allow a user to view and interact with content covered by the product shadow 624. For example, the product shadow 624 can cover part of a product description presented in the product display region 612 and a user is able to read the covered text.

In certain implementations, content presented in the web page 600 in the area of the product shadow 624 is presented differently from content presented in another part of the Web page 600. For example, content presented in the product display region 612 and covered by the product shadow 624 can be highlighted while content not covered by the product shadow 624 is not highlighted. Distinguishing content covered by the product shadow 624 can be selected by a user to view the content more easily than if the covered content were not distinguished.

In one example, the font color of text covered by the product shadow 624 is adjusted so that the text is more legible. In another example, content covered by the product shadow 624 is outlined to make the covered content easy to identify.

In certain implementations, one or more of the product thumbnail images 620a-d are covered by the product shadow 624. For example, the product thumbnail image 620b can be covered, either partially or completely, by the product shadow 624.

The web page 600 includes an additional content region 626. The additional content region 626 can present additional information associated with the currently selected product (e.g., the selected product image 610). Additional content can include user reviews or ratings, additional product information not presented in the product display region 612, and/or other content, such as the content described above.

A number of implementations have been described. Nevertheless, it will be understood that various modifications may be made without departing from the spirit and scope. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other embodiments are within the scope of the following claims.

What is claimed is:

1. A computer-implemented method for providing a graphical user interface (GUI), the method comprising:
displaying, on a client device, a GUI including a main image and a rotating carousel with a first plurality of images, each of the first plurality of images having a height equal to or less than a first height and associated with a different product than the other images, the main image having a second height and overlapping a portion of the rotating carousel, a ratio between the first height and the second height being about 1:2 or less, wherein the rotating carousel includes a directional control which changes the location of the first plurality of images in the rotating carousel while the main image remains stationary;
providing, from the client device to a retail server, a selection of the directional control; and
receiving GUI content, by the client device from the retail server based on the selection of the directional control, in the rotating carousel, wherein the GUI content relocates a first image of the first plurality of images from a first position adjacent the main image to a second position on the opposite side of the main image from the first position, the first position and the second position included in the rotating carousel.

2. The method of claim 1, wherein the main image is associated with a main product for the GUI.

3. The method of claim 2, wherein at least one of the first plurality of images presents an image of a product complementary to the main product.

4. The method of claim 2, further comprising:
automatically increasing or decreasing how many images are in the rotating carousel based on a change in view or size of the main product image.

5. The method of claim 2, wherein the GUI displays product information about the main product.

6. The method of claim 5, wherein the GUI displays a price of the main product.

7. The method of claim 1, wherein the rotating carousel is horizontal.

8. The method of claim 1, wherein each of the first plurality of images are presented in the GUI when the GUI is initially displayed on the client device, and an image different from each of the first plurality of images is presented in the GUI upon selection of the directional control.

9. The method of claim 8, wherein the rotating carousel is associated with a second plurality of images prior to the displaying, the second plurality of images including the first plurality of images and the image different from each of the first plurality of images.

10. The method of claim 1, further comprising presenting, based on detection of a pointer being positioned over one of the images, product information on the GUI, wherein the product information is associated with the one of the images.

11. A system for providing a graphical user interface (GUI) for a retail environment, the system including:
at least one server configured to provide a GUI on a display device, the GUI including:
a main product image and a rotating carousel including a first plurality of images, the main product image overlaying a portion of the rotating carousel and being associated with a main product, each of the first plurality of images being of a respective product associated with the main product, an aspect ratio between a height of the main product image and a maximum height of the first plurality of images being greater than 2:1, wherein the rotating carousel includes a directional control; and
the server is configured to, in response to receiving a selection of the directional control, move one of the first plurality of images that is adjacent to the main product image to the opposite side of the main product image in direction associated with the directional control while the main product image is substantially stationary on the display device.

12. The system of claim 11, wherein the GUI includes one or more thumbnail images of the main product that can be selected by a web page user to change the main product image upon selection of one of the one or more thumbnail images of the main product.

13. The system of claim 11, wherein the GUI includes a product information region.

14. The system of claim 13, wherein the product information region includes one or more items selected from the group consisting of:
a quantity box, a shopping cart link configurable upon selection to allow a web page user to add the main product to a shopping cart, a desired products link configurable upon selection to allow the web page user to add the main product to a desired products list, a notify link configurable upon selection to instruct a retail enterprise to notify the web page user by email when the main product is on sale, and a share link configurable upon selection to allow the web page user to share information regarding the main product with one or more additional users.

15. The system of claim 11, wherein each of the first plurality of images presents product information associated with the image upon detection of a selection of the associated image.

16. The system of claim 11, wherein at least one of the first plurality of images is an image of a product complementary to the main product.

17. The system of claim 11, wherein at least one of the first plurality of images is selected based on a rule associated with the main product.

18. A computer-implemented method for providing a graphical user interface (GUI), the method comprising:
displaying, on a client device, a GUI having a product web page including a first main image and a rotating carousel with a first plurality of images, each of the first plurality of images having a height equal to or less than a first height and associated with a different product than the other images, the first main image having a second height and overlapping a portion of the rotating carousel, the first height being less than the second height, wherein the rotating carousel includes a directional control;

providing, from the client device to a retail server, a selection of the directional control;

receiving first GUI content, by the client device from the retail server based on the selection of the directional control, in the rotating carousel, wherein the first GUI content either:

relocates a first image of the first plurality of images from a first position adjacent the first main image to a second position on the opposite side of the first main image from the first position while maintaining the first main image stationary, the first position and the second position included in the rotating carousel; or replaces the first main image with a second main image associated with one of the first plurality of images previously adjacent to the first main image and associated with a second main product, and provides a second plurality of images in the rotating carousel, the second plurality of images being a subset of the first plurality of images.

19. The method of claim 18, wherein, after the providing, a web page user can interact with the rotating product and cannot interact with the remainder of the product web page.

20. The method of claim 19, wherein, after the providing, the remainder of the product web page is opaque.

21. The method of claim 19, further comprising:
receiving, from the client computing device, a selection of the second main image; and
providing second GUI content, from the retail server to the client device based on the receiving the selection of the second main image, in the GUI, the second GUI content including product information associated with the second main product.

22. The method of claim 21, wherein, after the providing of the second GUI content, the web page user can interact with the remainder of the product web page.

23. The method of claim 18, wherein the rotating carousel is horizontal.

* * * * *